United States Patent [19]

Prasad et al.

[11] 4,246,291
[45] Jan. 20, 1981

[54] DECAFFEINATION OF AQUEOUS EXTRACTS

[75] Inventors: Ravi Prasad, Middletown, N.Y.;
 Martin Gottesman, Paramus, N.J.;
 Robert A. Scarella, Hawthorne, N.Y.

[73] Assignee: General Foods Corporation, White Plains, N.Y.

[21] Appl. No.: 23,878

[22] Filed: Mar. 26, 1979

[51] Int. Cl.$^3$ ............................................... A23F 5/18
[52] U.S. Cl. ................................... 426/387; 426/427
[58] Field of Search ................................ 426/387, 427

[56] References Cited

FOREIGN PATENT DOCUMENTS 2638383  3/1977  Fed. Rep. of Germany ............ 426/427

Primary Examiner—Joseph M. Golian
Attorney, Agent, or Firm—Thomas R. Savoie; Daniel J. Donovan

[57] ABSTRACT

Aqueous extracts of roasted coffee are stripped of aroma, concentrated and thereafter decaffeinated by means of contact with a decaffeinating fluid such as liquid or supercritical carbon dioxide. Aroma loss is minimized by using water to remove caffeine and aroma from the $CO_2$ stream, recovering aromatics from this caffeine-containing aqueous stream and adding-back these aromatics to the decaffeinated extract. Preferably equipment cost is minimized by use of a single pressure vessel to transfer the caffeine from the extract stream to the $CO_2$ and from the $CO_2$ to the water stream.

4 Claims, 1 Drawing Figure

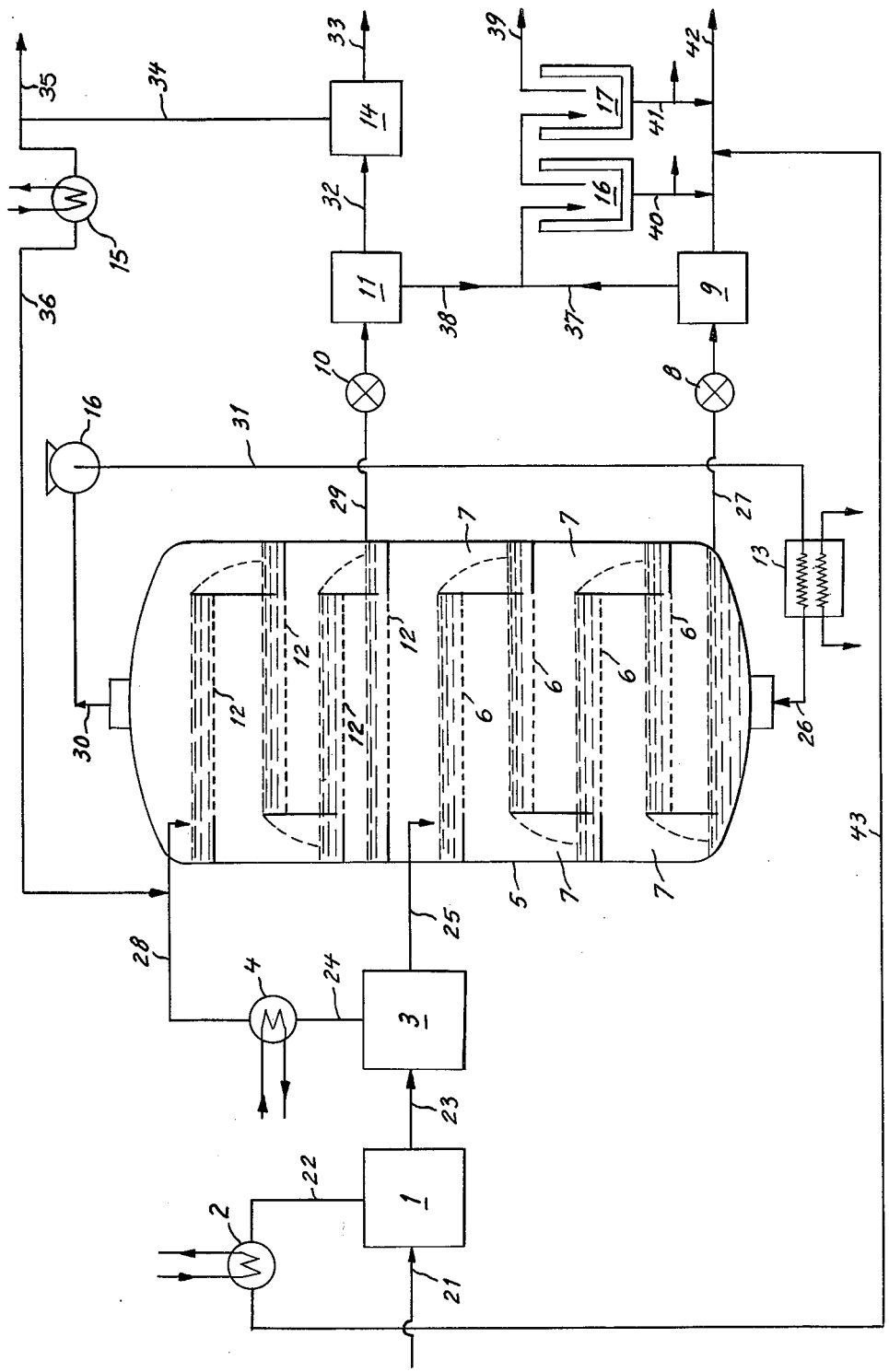

DECAFFEINATION OF AQUEOUS EXTRACTS

TECHNICAL FIELD

Several methods have previously been disclosed for removing caffeine from coffee by means of supercritical gases such as carbon dioxide. The decaffeination of green coffee is described in British Pat. No. 1,290,117 to Zosel, the decaffeination of roasted coffee is described in U.S. Pat. No. 3,843,824 to Roselius et al. and the decaffeination of aqueous coffee extract has been described in West German Offenlegungsshrift No. 2,638,383 assigned to DEJ International Research Company.

Decaffeination techniques which involve the contact of supercritical gases with solid coffee material results in a rather slow process which is quite capital intensive and not readily designed for continuous operation. As noted in the DEJ disclosure, fluid extraction systems are readily designed for continuous operation.

Although the decaffeination techniques disclosed herein are suitable for use in decaffeinating any type of caffeine-containing aqueous solution, such as aqueous extracts of green or roasted coffee, the preferred application is the decaffeination of aqueous extracts of roasted coffee. Prior attempts to decaffeinate roasted coffee extracts have not met with success since the resulting extract and soluble powder obtained therefrom have been devoid of acceptable coffee flavor. This unfavorable situation has been found to exist even in (e.g. U.S. Pat. Nos. 2,933,395 to Adler et al. and 4,031,251 to Margolis et al.) decaffeination processes in which the extract is subjected to a stripping operation in order to remove desirable volatiles before the decaffeination step, with these volatiles being added back to the extract at a subsequent processing stage. Evidently the stripping operations that can be performed on coffee extract, which cannot be so rigorous as to degrade desirable volatiles, are not able to completely devolatilize the extract. Consequently significant amounts of volatiles pass through the decaffeination step and are lost. Add-back of the stripped volatiles to the decaffeinated extract yields an extract which is still deficient in coffee flavor and aroma.

According to the present invention, there is described a process wherein a roasted coffee extract is decaffeinated in such a manner that the resulting decaffeinated extract possesses a flavor and aroma quite like the initial caffeine-containing extract.

DISCLOSURE OF THE INVENTION

An aqueous extract of roasted coffee is obtained in any manner known to those skilled in the art such as by means of a batch or continuous extraction process or the conventional multi-stage, countercurrent percolation process. Such an extract may contain from about 10% to 35% by weight of coffee solubles, typically about 15 to 30%. This extract is then subjected to a stripping operation during which volatiles are removed. Usually steam and/or vacuum is employed to remove from about 5 to 15% by weight of the extract. Typically, stripping is performed by passing the extract continuously through a single-stage film evaporator operated at an absolute pressure of from 150–760 mm. Hg. The vapor strippings are then condensed for subsequent add-back.

The stripped extract is next concentrated to a solids content of between 30% and about 50% by weight. This concentration may be carried out in any suitable evaporator, for instance a two-stage evaporator or a thin-film evaporator. The aqueous evaporate from the evaporator is condensed and collected for subsequent use in recovering caffeine from a caffeine solvent stream.

The concentrated extract, which is still found to contain significant amounts of volatiles, is fed to a pressure extraction vessel where it is contacted in a continuous, countercurrent fashion with a fluid which is capable of selectively removing caffeine from the extract and which fluid is either a liquefied gas or a supercritical fluid at the conditions at which the decaffeination operation is effected. It has been found, however, that these fluids will also remove some of the volatiles contained in the extract. Among the substances, which may be used alone or in combination, suitable for use as the decaffeinating fluid are $CO_2$ $N_2O$, Xe, the $C_1$ to $C_6$ alkanes such as propane, butane, etc., and $C_2$ to $C_6$ alkenes such as acetylene, isobutylene, etc., with carbon dioxide being the preferred fluid. Conditions within the extraction vessel may range between 10° C. and 180° C. and 50 to 450 atmospheres. With liquid $CO_2$, a temperature of from 20° C. to 31° C. and a pressure of about 75 atmospheres is preferred. With supercritical $CO_2$ preferred conditions are 32° C. to 40° C. and 150 to 300 atmospheres.

The extraction vessel or column could be any continuous (differential) liquid-liquid contact equipment, such as described in *Perry's Chemical Engineers' Handbook* 4th Ed. (McGraw-Hill, Inc. 1963) at pages 21-23 to 21-35, with a perforated-plate (sieve plate) tower being most preferred. As dictated by the respective densities, the extract will be fed at the top of the extraction zone and the decaffeinating fluid will be fed at the bottom. The mass flow ratio of the decaffeinating fluid to extract will preferably be in the range of 10:1 to 250:1, typically about 25:1 to 100:1.

The decaffeinated extract is removed at the bottom of the extraction zone and fed to a vent tank through a suitable pressure reduction valve. The volatile-containing vapors exiting the vent tank are then condensed at cryogenic temperatures in one or more stages. These condensed volatiles or fractions thereof may then be employed to aromatize the decaffeinated extract or the dry powder produced from this extract. The decaffeinated extract may be combined with available aroma components such as the condensed strippings and the aforementioned cryogenically condensed volatiles and then dried to a powder such as by spray or freeze drying.

The now caffeine-containing liquid gas or supercritical fluid stream is then stripped of caffeine and volatiles by contact with an aqueous stream which contains the aqueous condensate obtained from the evaporator. This contact may be effected in any of the liquid-liquid contact equipment referred to above with the sieve-plate tower again being preferred. The mass flow ratio of the upward flowing liquid gas or supercritical fluid to the downward flowing aqueous stream will preferably be in the range of 250:1 to 5:1.

In the preferred embodiment of this invention, a single sieve-plate tower is used for both caffeine extractions, with caffeine passing from the extract to the decaffeinating fluid in a bottom extraction section and caffeine passing from the caffeine-containing fluid to the aqueous stream in a top extraction section. When a single pressure vessel is used for both caffeine extractions, substantially the same pressure conditions will exist throughout the vessel and the essentially caffeine-free liquid gas or supercritical fluid may be recirculated from the top to the bottom of the column without a large expenditure of energy. Typically when two separate vessels are used, the pressure will be the same in both; however, the use of differential pressures could be employed. It may be desirable to employ a temperature differential between the two extraction zones in order to optimize respective caffeine extractions. This temperature differential could be employed in either a single or two vessel system. According to the process of this invention, any volatiles contained in the liquid gas or supercritical fluid stream that are not extracted by the aqueous stream are not lost but are retained within the decaffeination system. Any volatiles contained in the entering decaffeinating fluid stream would tend to minimize extraction of volatiles from the concentrated extract.

The caffeine-containing aqueous stream which is removed at the bottom of the second extraction zone is also fed to a vent tank through suitable valving. The volatile containing vapors exiting the vent tank are then cryogenically condensed. This condensation equipment may be the same equipment previously referred to and the condensed volatiles may be employed in the same manner. Thereafter the caffeine-containing aqueous stream may be processed in any conventional manner in order to remove and recover caffeine. Such steps as evaporation, membrane separation, crystallization and the like may be employed. Typically at least a portion of the decaffeinated aqueous stream obtained from the caffeine recovery operation is incorporated into the aqueous stream fed to the second extraction zone. The remaining portion of the decaffeinated liquid will exit the system as a waste stream. Any aromatics that may remain in this stream may be recovered for add-back to the decaffeinated extract.

BRIEF DESCRIPTION OF DRAWING

The details of this invention will be described in connection with the accompanying drawing which depicts a flowsheet diagram of the preferred embodiment of the invention.

BEST MODE FOR CARRYING OUT THE INVENTION

Roasted coffee extract having a solids content of 15 to 25% by weight is fed via line 21 to vacuum stripper 1 where from 5 to 15% by weight of the extract is removed. The strippings are passed to condenser 2 via line 22 and the stripped extract is fed to evaporative concentrator 3 via line 23 where it is concentrated to between 30 and 50% by weight. The evaporate is passed to condenser 4 via line 24 and the concentrated extract is fed to the mid-section of a sieve plate contact tower 5 via line 25. The extract flows horizontally across each perforated plate 6 and passes to the plate beneath, through the downspouts 7 in a manner well-known to those skilled in the art. Supercritical carbon dioxide at a temperature of from 32° C. to 180° C. and a pressure of from 120 atm. to 450 atm., preferably from 32° C. to less than 40° C. and 150 to 300 atmospheres, is fed to the bottom of tower 5 via line 26 and proceeds through the tower by passing through the perforations in each plate and rising in droplet form through the denser extract. Decaffeination of the extract is effected in this manner and the decaffeinated extract flows from the tower via line 27 through rotary gate valve 8 and into vent tank 9.

The condensate from the evaporator is fed to the top of tower 5 via line 28 where it is combined with the recycled water of line 36. This aqueous fluid passes down through the top section of the tower 5 and exits the tower via line 29 and passes through rotary gate valve 10 and into vent tank 11. The supercritical carbon dioxide rises through the top section of tower 5 through the perforated plates 12 and is decaffeinated by means of contact with the aqueous fluid. The essentially caffeine-free supercritical fluid passes from the tower via line 30 and is fed by means of recirculating pump 16 back to the bottom of the tower through line 31, heat exchanger 13 and line 26.

Although not shown, it would be desirable for tower 5 to be equipped with a liquid collection system between plates 6 and 12 so that, in the event carbon dioxide flow were interrupted, such as due to pump failure, the aqueous fluid present in the top section of tower 5 will not fall into the bottom section of the tower.

After being vented, the caffeine-containing aqueous fluid passes via line 32 to a caffeine recovery system 14. Included in the system could be such known concentration devices as evaporators, reverse osmosis units and the like. Caffeine crystals or a concentrated caffeine solution exits system 14 via line 33 and constitutes a valuable by-product of the decaffeination system. An essentially caffeine-free aqueous fluid exits system 14 via line 34. A portion of this fluid may be removed (via line 35) as waste from the decaffeination process, although this aqueous fluid could be used elsewhere in a coffee processing plant. The remaining portion of the aqueous fluid is recycled to the top of tower 5 via line 36. In the event system 14 is comprised of an evaporator, condenser 15 will be present in line 36. (or 34)

Volatile containing vapors which pass from vent tanks 9 and 11 via lines 37 and 38, respectively, are drawn through a two-stage condenser system by means of a vacuum source (not shown) connected to line 39. The first condenser state 16 is cooled down to a temperature between $-20°$ C. and $-80°$ C. and the second stage 17 is maintained in the order of $-196°$ C. The condensed volatiles which may be in the form of either liquid or frost are removed from the separate condenser stages (lines 40 and 41, respectively) and may be incorporated in any desired amount or ratio either with the decaffeinated extract of line 42 and/or the dry soluble powder obtained upon drying this extract. The condensed volatiles obtained from stripper 1 and fed via line 43 are also incorporated into the decaffeinated extract.

Operation in accordance with the aforementioned process produces a decaffeinated extract of roasted coffee comparable in flavor and aroma to the starting caffeinated extract. The caffeine-containing stream 33 and waste water stream 35, which represent the only streams in which volatiles could be lost, contain little detectable aroma.

The following Example is given by way of illustration and not limitation. All percents are weight percents.

EXAMPLE

Employing the apparatus shown in the drawing, roasted coffee extract having a solid content of 15% is fed to vacuum stripper 1 at a rate of 5,000 Kg./hr. A 5% strip is obtained and passed to condenser 2. The stripped extract is concentrated to 30% solids at 3 with 2,250 kgs. of extract being fed to the mid-section of sieve-plate tower 5 and 2,500 kgs. of evaporate condensed at 4. The concentrated extract is contacted with supercritical carbon dioxide at a temperature of 40° C. and a pressure of 300 atm. and with a mass flow rate of 225,000 kgs./hr. whereby 30 kgs./hr. of caffeine are passed from the extract to the $CO_2$ stream. Decaffeinated extract (about 97% decaffeinated) at a rate of 2,200 kg./hr. is passed and fed through pressure reduction valve 8 and into vent tank 9. The condensate from 4 is combined with 8,750 kg./hr. of water from stream 36 and is fed to the top of column 5 at a rate of 11,250 kg./hr. This water stream extracts caffeine from the rising $CO_2$ stream and exits the tower via line 29 at a rate of 11,280 kg./hr. and passes through pressure reduction value 10 and into vent tank 11. Vapors are drawn from vent tanks 9 and 11 by means of a 71 cm. vacuum source (line 39), first through condenser 16 which is cooled by means of liquid $CO_2$ and then condenser 17 cooled by means of liquid nitrogen. The condensates from both 16 and 17, as well as the condensate from (via line 43) condenser 2, are added to the decaffeinated extract which is fed via line 42 to a spray dryer at a rate of 2,470 kg./hr.

The caffeine-containing aqueous stream is fed via line 32 to the caffeine recovery system 14 comprised of an evaporator and a crystallizer. Thirty kgs./per hour of caffeine are removed via line 3 and 11,250 kg./hr. of water vapor exit through line 34. About 2,500 kg./hr. of water vapor pass out of the system by line 35 and 8,750 kg./hr. of water vapor are condensed at 15.

Having thus described the invention what is claimed is:

1. A method of decaffeinating an aqueous caffeine-containing extract of roasted coffee comprising the steps of:
   (a) subjecting the extract to a stripping operation in order to remove volatiles and from about 5 to 15% by weight of the extract,
   (b) condensing the extract strippings of step (a);
   (c) evaporatively concentrating the stripped extract to a solids concentration between 30% and 50% by weight;
   (d) condensing the aqueous evaporate of step (c),
   (e) continuously contacting the concentrated extract in a countercurrent fashion with a decaffeinating fluid at a temperature between 10° C. and 180° C. and a pressure between 50 to 450 atmospheres, said fluid being either a liquid gas or a supercritical fluid at the conditions at which the decaffeination operation is effected;
   (f) thereafter, contacting the caffeine-containing fluid from step (e) with an aqueous stream containing the condensed evaporate of step (d), at a temperature between 10° C. and 180° C. and a pressure between 50 to 450 atmospheres in order to decaffeinate said fluid;
   (g) passing the decaffeinated extract of step (e) and the caffeine-containing aqueous stream from step (f) to vent tanks and condensing volatiles exiting the vent tanks;
   (h) removing caffeine from the aqueous stream of step (f) and combining at least a portion of this decaffeinated liquid with the condensed evaporate of step (d) to form the aqueous stream of step (f);
   (i) adding condensed strippings from step (b) and condensed volatiles from step (g) back to the decaffeinated extract resulting from step (e).

2. The method of claim 1 wherein the decaffeinating fluid is selected from the group consisting of $CO_2$, $N_2O$, Xe, $C_1$ to $C_6$ alkanes, $C_2$ to $C_6$ alkenes and mixtures thereof.

3. The method of claim 1 wherein step (e) decaffeination of the concentrated extract occurs in the bottom section of a sieve-plate tower and step (f) decaffeination of the fluid occurs in the top section of the same sieve-plate tower.

4. The method of claim 3 wherein the decaffeinating fluid is selected from the group consisting of $CO_2$, $N_2O$, Xe, $C_1$ to $C_6$ alkanes, $C_2$ to $C_6$ alkenes and mixtures thereof.

* * * * *

UNITED STATES PATENT AND TRADEMARK OFFICE
CERTIFICATE OF CORRECTION

PATENT NO. : 4,246,291

DATED : January 20, 1981

INVENTOR(S) : R. Prasad et al.

It is certified that error appears in the above–identified patent and that said Letters Patent are hereby corrected as shown below:

In column 4, line 41, change "state" to -- stage -- .

In column 5, line 9, change "2,200" to -- 2,220 -- .

Signed and Sealed this

Twenty-third Day of March 1982

|SEAL|

Attest:

Attesting Officer

GERALD J. MOSSINGHOFF

Commissioner of Patents and Trademarks